United States Patent [19]

Larson

[11] 4,352,390

[45] Oct. 5, 1982

[54] PRECISION SILICA CONES FOR SAND CASTING OF STEEL AND IRON ALLOYS

[75] Inventor: David L. Larson, Chagrin Falls, Ohio

[73] Assignee: Sherwood Refractories, Inc., Cleveland, Ohio

[21] Appl. No.: 186,415

[22] Filed: Sep. 12, 1980

Related U.S. Application Data

[62] Division of Ser. No. 966,070, Dec. 4, 1978, Pat. No. 4,236,568.

[51] Int. Cl.³ ............................................. B22C 1/00
[52] U.S. Cl. .................................... 164/351; 164/369
[58] Field of Search ............... 164/520, 523, 525, 528, 164/529, 369, 28, 138, 122.1, 122.2, 351; 106/38.9

[56] References Cited

U.S. PATENT DOCUMENTS 2,211,133  8/1940  Krosta ............................ 164/529 X
3,540,519  11/1970  Yates ............................... 164/529 X
4,093,017  6/1978  Miller, Jr. et al. ............. 164/520 X Primary Examiner—Gus T. Hampilos
Assistant Examiner—K. Y. Lin
Attorney, Agent, or Firm—Vincent A. Greene

[57] ABSTRACT

Partially devitrified silica cores with exceptional high temperature strength are disclosed for foundry use in sand casting of ferrous alloys. Precision cored holes of small size and long length, which heretofore could not be cast accurately or had to be machined because of limitations in existing core technology, are formed using accurately machined extruded porous silica cores fired to eliminate combustibles and partially devitrified (e.g., 15 to 30%) to develop a strong crystalline phase bond that resists viscous flow at a temperature of 1500° C. and to increase the refractoriness of the vitreous silica grains, whereby the permeability and thermal shock resistance are such that the core can be heated very rapidly by molten steel to above 1500° C. without spalling, cracking, sagging, breaking, or loss of integrity and without gas holes, scabs, fissures or other serious casting defects. The cores are made from an extrudable composition containing vitreous silica, a mineralizer, an organic binder, and a plasticizer and/or tempering fluid. High-purity vitreous silica grains are mixed with a mineralizer and large amounts of finer vitreous silica particles (e.g., below 10 microns) which bond the silica grains together to provide extremely high strength after firing. The extruded cores are fired to form cristobalite in major amounts in the bond region between grains and in minor amounts in surface portions of the silica grains. The sand casting process of the invention can employ hollow porous thin-wall cores having small diameters, such as 0.4 to 2 centimeters or less, and length-to-diameter ratios, such as 20:1 or more. The problem of casting defects due to gassing is solved by causing the expanding gases to move radially inwardly to the central passage of the hollow core.

21 Claims, 11 Drawing Figures

U.S. Patent     Oct. 5, 1982     4,352,390
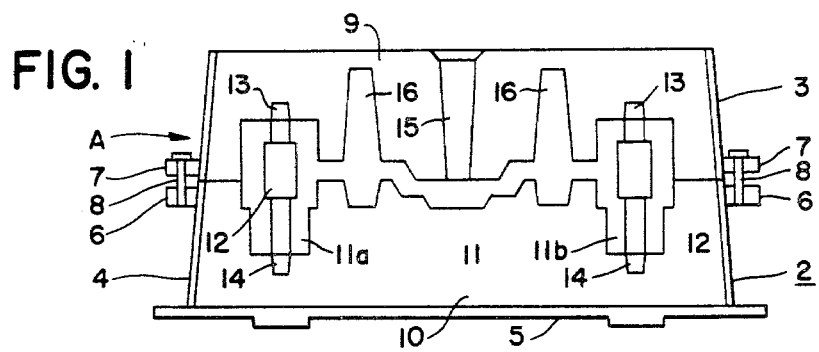
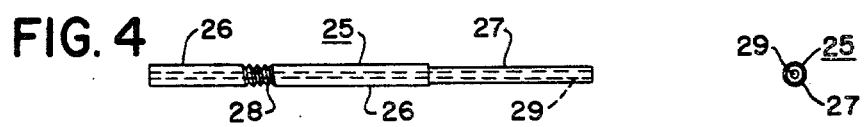
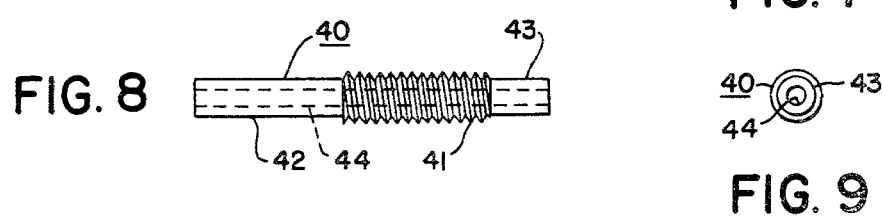

PRECISION SILICA CONES FOR SAND CASTING OF STEEL AND IRON ALLOYS

This is a division of allowed application Ser. No. 966,070, filed Dec. 4, 1978 now U.S. Pat. No. 4,236,568.

BACKGROUND OF THE INVENTION

The present invention relates to improved refractories and moulds for high temperature metal casting, methods of making the same, and improved processes for casting high melting alloys, such as steel and iron alloys. The invention is particularly concerned with the ferrous casting industry where the vast majority of parts are made by sand casting.

Quartz sand has always been the principal refractory used by ferrous foundries for sand moulds and cores. When the quartz grains have a high purity, they have enough refractoriness to permit ferrous metal casting. However, crystalline silica or quartz is an inferior refractory because its refractoriness is much lower than other refractories, such as zircon and alumina, and because it has notoriously poor thermal shock resistance due to the sudden alpha-beta inversion ($\alpha \rightarrow \beta$) as the crystalline silica converts from the alpha to the beta form or vice versa (e.g., beta-quartz to alpha-quartz).

Thermal shock is less of a problem in standard sand moulds and sand cores used in ferrous foundries because of high permeability, the absence of substantial amounts of fine refractory particles between the sand grains, and the large size of the grains (e.g., 150 to 200 microns). The large spaces between the sand grains provide room for expansion and contraction of individual grains and thereby minimize the total forces generated during the alpha-beta inversions. This is not true, however, in compacted silica moulds of low permeability having substantial amounts of rigid refractory material occupying the spaces between the refractory grains, and the sudden volume change during the alpha-beta inversion may cause defective castings due to mould failure, spalling, cracking and the like.

In spite of its shortcomings, quartz sand was, at one time, commonly used in the precision investment casting industry to make precision moulds and cores. Prior to 1955, quartz sand was used commercially for precision investment casting of small metal parts by the "lost-wax" process. Rigid metal flasks were used to receive the refractory moulding composition and to provide the mould with the needed strength. The foundry procedures had to be carefully controlled to avoid catastrophic damage to the mould due to the alpha-beta inversion problem, and the problem was even more serious when cores were used. The quartz moulds required slow heating through the alpha-beta inversion to minimize damage due to the sudden expansion of the crystalline silica particles. After the mould temperature was above 400° C., the inversion was no longer a problem and the mould was fired to eliminate combustibles and then used, while still hot, to cast the metal (e.g., a turbine blade). The metal had to be poured while the mould was still above the alpha-beta inversion temperature to avoid mould shattering due to the violent expansion during contact of the mould with the molten metal and to avoid damage from two more trips through the crystallographic inversion (e.g., contraction damage during cooling to room temperature and expansion damage during subsequent heating). Even though the damage to the quartz mould (or core) could be reduced by cooling and heating the mould very slowly over a very long period of time, such precautions did not solve the problem and were too costly to be practical. Thus, prior to 1955, it was important for each metal foundry engaged in precision investment casting to have equipment for firing its own silica moulds and cores.

Soon after 1955, these foundries became obsolete. With the advent of flash-fire dewaxing, the precision investment casting industry turned away from quartz sand moulds and moulding flasks and used shell moulds instead. It became impractical to use quartz sand or crystalline quartz in precision ceramic cores, and core manufacturers found it necessary to employ large amounts of vitreous silica to provide proper thermal shock properties in precision investment cores and to minimize the alpha-beta inversion problem. For the last twenty years the typical precision cores for investment casting of superalloys have contained 60 to 80 percent by weight of vitreous silica and 20 to 40 percent by weight of zircon or other refractory.

It was necessary to use major amounts of silica in the cores to facilitate leaching, and vitreous silica was preferred because of its excellent thermal shock properties in spite of the potential devitrification problems and inferior refractoriness. Typical cores containing 70 percent silica and 30 percent zircon have adequate refractoriness to permit casting of common nickel-base and cobalt-base alloys used in aircraft turbine engine parts, for example, and have been used for this purpose for two decades.

Although it has poor leaching characteristics, zircon is a superior refractory. In a core the amount used is preferably no more than 30 to 40 percent by weight, but in a precision investment shell mould much more can be used because leaching is not necessary. Zircon has better refractoriness than silica and, unlike silica, is not subject to the sudden catastrophic volume changes characteristic of the alpha-beta inversion. During the last 20 years, precision investment shell moulds have employed major amounts of refractories, such as zircon, aluminum silicate or alumina, which permitted casting of nickel-base and cobalt-base superalloys at temperatures up to 1550° C. or higher. Shell moulds of this type could also be used to cast steel alloys because of the excellent high temperature properties. The metal casting temperatures had to be limited, however, when using leachable cores containing major amounts of silica in order to avoid core failure or excessive core deformation. Heretofore, the inferior performance of typical silica cores at high temperatures made them a poor choice for casting metals, such as steels and superalloys, which required unusually high pouring temperatures. This is one reason that the typical precision ceramic cores used in investment casting have heretofore been considered by the ferrous casting industry as generally impractical for commercial casting of steel and iron alloys.

The limitations of known refractories have always provided a serious problem when casting ferrous alloys because of the high casting temperatures required, and ferrous foundries have long needed an improved refractory system, particularly one which would permit casting at reasonable cost with greater precision and fewer casting defects. As previously pointed out, crystalline silica or quartz sand has inferior refractoriness and is particularly troublesome because of the alpha-beta inversion, but quartz sand is still the mainstay of the ferrous casting industry, both for moulds and cores. Refractories with superior refractoriness, such as alumina, zirconia and magnesia, are generally not used for ferrous casting because of poor thermal shock characteristics. High purity quartz sand is by far the preferred refractory for sand casting, although zircon and olivine sands are also used. Fused silica sand or vitreous silica has heretofore been considered unsatisfactory by ferrous foundries as a replacement for quartz sand in sand moulds and cores, although it has sometimes been used in small amounts to improve the high temperature strength of sand cores.

Because the present invention is concerned with a simple, but revolutionary change in the refractory systems used for casting of ferrous alloys and solves problems which have existed for many decades, it is important, in order to understand the nature of the problems, to consider the conventional processes used by ferrous foundries.

Basic processes used for non-ferrous metals, such as permanent-mould casting and die casting, are not practical for casting ferrous alloys. Sand casting has been the only process considered suitable for commercial foundry casting of ferrous alloys because of the extremely high pouring temperatures required, often exceeding 1600° C. and this process accounts for the vast majority of all metal castings.

Sand casting processes employ a low-temperature binder or organic binder which is present when the molten metal is poured into the sand mould and provides the mould with strength until the metal solidifies. A molten ferrous alloy is poured into the sand mould, usually while the mould is at room temperature, and causes the mould to heat rapidly so as to weaken or destroy the organic binder near the metal-mould interface, but the mould usually has a large mass, several times that of the metal casting and can absorb large amounts of heat to avoid overheating so that the mould will hold together until the metal solidifies.

Foundries collect and reuse the moulding sand because it requires about 4 to 5 tons of sand for each ton of metal casting. When cores are used, they are commonly made from the same type of sand as the mould to minimize contamination of the moulding sand.

A moulding sand may contain up to 50 percent by weight of clays, such as bentonite or fire clays. When additional strength is needed, a sand mould or core is made of a core sand containing an organic or resin binder which can be hardened by baking at a temperature of 250° to 450° C.

The sand used in making the mould or core must provide good refractoriness to withstand the high pouring temperatures, high permeability to permit rapid escape of gases, and collapsibility to permit the metal to shrink after it solidifies. It should also have thermal shock resistance because heat from the molten metal causes rapid expansion of the sand surface at the mould-metal interface which can result in spalling, cracking, buckling or flaking at the mould surface.

Sand casting is a terribly demanding application for a refractory mould body, particularly a core body, because of the extremely severe conditions involved in casting ferrous alloys. Thermal shock, for example, is at a maximum when refractory grains at room temperature engage molten iron at 1500° to 1600° C. A core body with small mass is subject to thermal shock damage due to the extremely rapid heating of the entire body and also to deformation or failure due to insufficient refractoriness, strength and resistance to viscous flow. The larger sand cores present less of a problem because they have adequate mass to avoid overheating before metal solidification and they are adequately strengthened by the organic binders in the cooler parts of the core, but the problems become extremely serious as the size and mass of the core is reduced.

For many decades the ferrous casting industry has had extreme difficulty in producing long holes of small diameter because of inadequate core technology and the limitations of known refractory materials. A small core used for ferrous casting can heat up above 1500° C., before the metal solidifies if the casting has significant mass, and the result is that the core loses strength, is unable to resist the large buoyant and inertia forces exerted by the molten metal on the core, and breaks or deforms. For this reason it has heretofore been impractical to provide thick steel castings with cored holes having small diameters, such as 1 to 2 centimeters, and length-to-diameter ratios in excess of 10:1, for example.

This problem has been recognized for many decades; but, heretofore, a satisfactory solution was not found. Deformation and sagging of the longer cores can be reduced by employing wire reinforcement or metal chaplets, but these are undesirable and are avoided as much as possible. Wires interfere with removal of the cores from the casting, can become stuck in or welded to the casting, and makes the cores more expensive to make. Chaplets are difficult to place, are unreliable and greatly reduce the rate of production while adding excessive cost. They also reduce the quality of the casting because they become part of the casting.

Attempts have been made to improve the hot strength of cores used in ferrous casting. In an oil-cereal-bonded sand core, for example, the organic binders char or carbonize at 400° to 500° C. and a coke bond may develop over the range of 400° to 1000° C. Supplementary binders such as bentonite, fire clay and iron oxide have been used to improve the strength of the core at temperatures above 1000° C. For example, a core may have a strength of ten kilograms per square centimeter at 1400° C. but the strength may drop to less than one kilogram per square centimeter at 1500° C. Heretofore, special cores have been used by ferrous foundries when high temperature strength became critical, but these generally had a strength less than 25 kilograms per square centimeter at 1400° C. At 1500° C. such a core could have insufficient strength to avoid deformation or failure due to the buoyant force of the molten metal.

Because of the limited high temperature strength and refractoriness of known core materials, the ferrous casting industry has adopted certain recommended limiting dimensional relationships for cores. The industry recommends that cores and isolated mould elements have a thickness at least twice the thickness of the surrounding metal sections and that cylindrical holes formed by cores with a diameter less than twice the metal wall thickness have a length no greater than the diameter. If the cylindrical hole formed by the core has a diameter from two to three times the thickness of the surrounding metal sections, then the accepted industry recommendation is that the length be no more than three times the diameter. For blind holes formed by cores supported at one end only, the recommended length is fifty percent less. Longer sand cores can be used if the metal thickness is reduced to permit more rapid solidification, but it is usually important to provide castings with substantial thickness.

The casting conditions and size limitations on cores are, of course, quite different in the precision investment casting industry when casting aircraft turbine engine components and the like from nickel-base and cobalt-base alloys. Precision leachable ceramic cores of the type used for investment casting during the last 20 years and made from major amounts of fused silica are entirely different from sand cores and have generally been considered impractical for commercial sand casting of steel and iron alloys. A typical sand core is made from sand grains having a substantial size, such as 150 to 200 microns and higher, and relatively free of fine particles so as to provide an AFS permeability number of 70 to 200, which is needed to avoid serious gassing problems, whereas a typical precision core for investment casting has an average particle size below 20 microns and a permeability too low for assigning a permeability number. A typical precision investment core has low permeability, loses strength at high temperatures, has inadequate strength at 1500° C. to avoid substantial deformation, and should not be used for casting ferrous alloys. Precision cores of the type used for investment casting are also inappropriate for use by ferrous foundries because of excessive cost and the difficulty of removing the core from the casting. The cost of precision investment cores is many times that of sand cores of comparable size. Sand cores also have the advantage of collapsibility and the ability to break down during knockout and cleaning operations. Precision investment cores, on the other hand, are much more difficult to remove from the metal casting and require leaching.

Standard precision silica cores of the type made in the investment casting industry during the last two decades for example, by the extrusion process, the injection moulding process or the ethyl silicate process are suitable for casting non-ferrous metals but are inappropriate for ferrous casting and will produce serious casting defects. The rapid heating of such a core from room temperature to 1500° C. or higher due to contact with molten steel, is accompanied by a sudden gas expansion that will produce gas holes and other surface defects in the casting. If such a standard silica core were to be used in a sand mould for making an internal cavity in a steel casting, the surface of such cavity would be rough and irregular and would contain blow holes or similar defects, making the casting suface undesirable and making core removal more difficult.

The vast majority of lost-wax investment castings are produced in thin-wall shell moulds built up by repeated applications of slurry dip coats and coarse stucco layers using an ethyl silicate binder, a colloidal silica binder or other high temperature binder in the ceramic slurry, but cope-and-drag investment flasks of the type commonly used prior to 1950 are sometimes employed for lost-wax investments. For example, quartz sand and/or other refractory material plus a suitable high temperature binder may be placed in the flask and compacted around the wax pattern, the pattern removed, and the mould section fired at a temperature of 1000° to 1100° C. to eliminate combustibles and form a rigid structure before the mould is used for metal casting.

The refractory mix used to fill the investment flask sometimes employs an ethyl silicate binder system in accordance with the so-called "Shaw process" which is relatively costly but is used to a limited extent. In that process, a permanent siliceous bond is produced by the formation of a silica gel in a hydrolyzed solution of the ester. For example, block moulds or contoured shells can be produced in the Shaw process using the gelation of ethyl silicate to bond a graded refractory, such as sillimanite. The hydrolyzed suspension is poured around the pattern and then sets to a rubbery consistency, at which stage the pattern can be withdrawn. To assist drying, the alcohol vapor is ignited with gas burners and the volume shrinkage of the investment produces craze cracking before the investment flask is placed in the furnace for firing to remove final traces of water and alcohol. The "microcrazed" structure comprises a multiplicity of craze cracks scattered throughout the mould body which weaken the mould but improve the permeability and thermal shock properties. When the crazed mould body is exposed to the heat shock of oven firing or contact with molten metal, the craze cracks close or move slightly to accept expansion of refractory grains and minimize or avoid rupture forces between grains. Ethyl silicate investment moulds therefore have good permeability and good thermal shock properties when using refractories with high refractoriness, such as zircon or sillimanite, and it is possible to cast ferrous alloys as well as nickel-base and cobalt-base superalloys; but, the excessive cost of such investments and other disadvantages limit their utility.

A number of practical problems arise when an ethyl silicate binder system is employed in the manufacture of refractory cores. The extensive network of craze cracks with lengths often several times the width of the refractory grains makes it possible to obtain permeabilities ten times that of conventional cores using other binders, but the craze cracks tend to reduce the strength of the core body and its resistance to deformation or failure. The cost of making ethyl silicate cores is many times that of other cores because of the low rate of production. Only a minor proportion of the precision cores used for lost-wax investment castings use the ethyl silicate binder system.

A typical precision ceramic core as used for forming internal cavities in turbine blades and other aircraft turbine engine components is made by a mass production process, such as extrusion or injection moulding, and can produce internal cavities with a high degree of accuracy and with a good surface finish, especially when the core is machined to close tolerances. Such precision has been achieved in the lost-wax investment casting industry for two decades, and porous leachable silica cores have made it possible to produce precision cavities of small diameter in the metal castings without the need for subsequent machining of the metal. Although conventional silica cores are temperature limited and will bow or deform if the casting temperature is excessive, they can produce long small diameter holes in most non-ferrous castings with a high degree of precision. This is not the case in the ferrous casting industry. Ferrous foundries have heretofore had no practical economical way to produce long small diameter holes in sand castings with close dimensional tolerances and have, therefore, found it necessary to rely on subsequent drilling or machining operations.

Precision ceramic cores based on silica have heretofore been inappropriate for ferrous casting and have failed to provide a satisfactory solution to this problem because of the thermal shock problem, gassing problems, and the excessive casting temperatures needed. Silica is a poor choice as a refractory for such high temperature casting. Vitreous silica has thermal shock resistance but cannot maintain its shape at 1500° C. and above. Maximum thermal shock resistance is needed for a refractory core heated in seconds from room temperature to 1500° C. by a molten iron alloy, and a crystalline silica is very poor in this respect.

Cristobalite, for example, has notoriously poor thermal shock properties due to the alpha-beta inversion. Even though its refractoriness is superior to that of vitreous silica, cristobalite has generally been considered undesirable and has seldom been added in substantial amounts to a refractory moulding composition except in custom-fitted dental moulding operations to compensate for contraction of the metal casting. It is possible, however, to heat a mould or core containing more than 60 percent by weight of alpha cristobalite from room temperature to 1500° C. without shattering the mould if the heating is very slow through the alpha-beta inversion and the mould is highly porous and can accommodate expansion of the individual grains. Damage by thermal shock can thereafter be minimized by pouring the molten metal after the mould or core is fired and heated to a high temperature, such as 1400° C. to 1500° C. There will be less damage due to sudden volume changes during the alpha-beta inversion if the silica mould contains less than 50 percent by weight of cristobalite at room temperature and is devitrified during firing to provide much larger amounts of cristobalite, provided that the mould is not cooled before metal casting. The slow heating and firing in the same foundry where the metal is cast is uneconomical and generally impractical, but this procedure can be employed to facilitate removal of a devitrified silica shell mould from a metal casting. For example, it has been proposed that a silica shell mould should be provided with large amounts of cristobalite formed by a mineralizer during firing so that after casting, the mould can be rapidly cooled with the metal casting below the alpha-beta inversion temperature to shatter the mould as disclosed in U.S. Pat. No. 3,540,519.

In the directional solidification of modern superalloys, all-silica cores can be devitrified just prior to metal casting by preheating and firing them up to one hour at a temperature of 1400° C. or higher to provide over 90 percent by weight of cristobalite before the metal is poured into the preheated mould as disclosed in U.S. Pat. No. 4,043,017. However, such a process is not applicable to sand casting of ferrous alloys and of no practical value to ferrous foundries, which do not prefire the sand moulds. Cristobalite heretofore has been considered inappropriate as a refractory for ferrous casting, particularly because of the severe thermal shock problems involved in sand casting operations.

In a large sand mould or sand core, thermal shock is less of a problem because of the very high permeability and the large spaces between grains to accommodate sudden expansion of the grains. Nevertheless, cristobalite is not considered desirable in a sand mould or core. In a conventional precision core made by extrusion or injection moulding, the silica particles are tightly compacted under high pressure, the permeability is a very small fraction of that of a sand core, and there is little room for the silica particles to expand. As a consequence, thermal shock problems are much more severe when casting at excessive temperatures. Silica cores of this type therefore require the superior thermal shock properties of vitreous silica and suffer from the inherent disadvantage of viscous flow at high temperature. The low permeability and low high temperature strength characteristic of these cores made them inappropriate for the standard sand casting processes, and the ferrous casting industry therefore did not use precision silica cores in such processes. Instead the industry continued to struggle with the existing core technology and proceeded on the assumption that there was no simple economical way to effect precision casting of long internal cavities of small cross section.

SUMMARY OF THE INVENTION

The present invention involves a giant step forward in the ferrous casting field and makes it possible to overcome the problems discussed above and to produce small internal cavities in a simple economical manner with a high degree of accuracy using relatively inexpensive precision silica cores having exceptional high temperature properties.

The invention attempts to provide high-quality hollow precision ceramic cores which are simple, versatile, and capable of being produced in quantity at low cost using mass production equipment. The hollow cores are intended to be inexpensive, to have an excellent surface free of large cracks, fissures or surface imperfections, to be well suited for centerless grinding or other precision machining operations, and to have tightly compacted grains but adequate space between grains for inward escape of gases during ferrous casting. To achieve these objectives, it is important to shape the core by economical high pressure methods, such as extrusion or high-pressure injection moulding, and to avoid ethyl silicate binders and the associated network of craze cracks or fissures even though the permeability is drastically reduced when such fissures are not present.

In order to compensate for limited permeability and avoid serious casting defects due to gassing problems, the cores of this invention are hollow and are provided with thin porous permeable walls that permit inward escape of gases to the central passage of the core. This enables the core to function properly during sand casting of steel and iron alloys. Although the reduction in core wall thickness would seem to magnify problems by making the core more susceptible to deformation, malfunction or failure due to lack of strength or thermal shock, particularly when the core has substantial length, the precision hollow cores of this invention are designed to provide adequate strength at room temperature to permit rough handling at high pressure and to provide remarkable strength and resistance to viscous flow at high temperatures above 1500° C. so that the core can withstand the buoyant and inertia forces of the molten metal flowing into the mould cavity and can maintain its shape until the metal solidifies.

The invention makes it possible to achieve good refractoriness and high temperature strength while at the same time retaining superior thermal shock properties by use of a unique refractory core composition containing major amounts of vitreous silica, an organic binder or other low temperature binder, a high temperature binder comprising finely divided particles of silica, and a mineralizer that promotes devitrification. The core is partially devitrified by firing for a substantial period of time to eliminate combustibles and to develop major amounts of insitu-formed cristobalite in the bond region between the refractory grains and minor amounts of cristobalite concentrated at the outer surface portions of the silica grains. The silica grains remain predominantly vitreous and have good thermal shock properties and yet have remarkable resistance to viscous flow at casting temperatures.

In accordance with the invention, a refractory composition or mixture is provided containing at least 40 and preferably at least 50 percent by weight of refractory grains with a particle size of 50 to 150 microns and at least 20 percent by weight of fine vitreous silica particles with a particle size less than 30 microns and preferably less than 20 microns which serve as the high temperature binder. The refractory particles of the mixture comprise at least 70 and preferably at least 80 percent by weight of vitreous silica, and the larger silica grains have a high-purity to avoid loss of refractoriness due to impurities. The mixture also contains 4 to 20 parts by weight of a suitable binder, and up to 20 or 25 parts by weight of a mineralizer per 100 parts by weight of refractory material to promote devitrification and formation of cristobalite. The refractory grains are primarily vitreous silica but may contain minor amounts of other refractories, such as zircon or zirconia.

In the preferred embodiment, the refractory mixture contains a plasticizer and a tempering fluid which provides an extrudable consistency and the mixture is extruded at a high pressure to form a long hollow extrusion of uniform cross section which is cut to a suitable length before drying.

Permeable refractory cores suitable for sand casting of ferrous alloys are made in accordance with the invention by extruding or otherwise shaping the refractory mixture under a high pressure, such as 40 kilograms per square centimeter or higher, while it is plastic and flowable to form a green core. The pressure is preferably sufficient to compact the refractory grains and improve the outer surface of the core. The green core is then heated to eliminate combustibles and fired at a temperature of 1000° C. to 1200° C. or higher to cause sintering and extensive devitrification in the bond region between the refractory grains and to form a rigid fired core containing at least 15 percent and preferably 20 to 30 percent by weight of insitu-formed crrystalline silica, a major portion by weight of the silica in the fired core being vitreous. The fired core is then cooled below 200° C. and below the alpha-beta inversion temperatures whereby the crystalline silica undergoes sudden contraction during the crystallographic inversion.

The proportions of fine silica particles, organic binder and mineralizer in the refractory mixture are chosen such that the cooled, fired core has a porosity of from 25 to 55 volume percent, a high modulus of rupture at 25° C., such as 100 kilograms per square centimeter, and a high strength and resistance to viscous flow at high temperature (e.g., a modulus of rupture of at least 50 kilograms per square centimeter at 1500° C.). The fired core preferably contains at least 0.04 percent by weight of devitrifying alkali metal or alkaline earth metal ions to promote devitrification and preferably contains an amount of cristobalite such that the viscosity is at least $10 \times 10^{11}$ poise at 1400° C. This enables the core to maintain its shape during casting of steel and iron alloys.

The refractory mixture used to make the core preferably contains a substantial proportion, e.g., 15 percent or more by weight, of very fine vitreous silica particles with a particle size less than 10 microns to facilitate extrusion, to facilitate development of a strong bond between the larger refractory grains, and to permit rapid development of a strong crystalline structure in the bond region between the grains. When formed insitu during firing of the core, cristobalite increases the strength of the core, but particles of cristobalite added to the original refractory mixture do not develop such strength.

Cristobalite is notorious in the casting field because of its tendency to cause cracking or weakening of a refractory body during the alpha-beta inversion, and it is worse in this respect than any other refractory. For this reason, ceramic engineers have limited the amount of cristobalite in cores. The vitreous silica used by core manufacturers in ceramic core compositions usually contains less than one percent by weight of cristobalite.

A remarkable feature of the present invention is the use of insitu-formed cristobalite to enable cores to have improved thermal shock resistance. The refractory silica grains of the core have a combination of properties well suited for ferrous casting including good thermal shock resistance due to the presence therein of more than 80 percent by weight of vitreous silica and improved refractoriness due to the presence of at least 5 percent by weight of cristobalite concentrated near the outer surfaces of the grains.

Although the fired cores of this invention preferably contain 65 to 80 percent or more of vitreous silica, they have remarkable resistance to viscous flow at 1500° C. and can maintain their shape during casting of steel and other ferrous alloys. The invention permits use of small precision ceramic cores by existing ferrous foundries in standard sand casting processes wherein the molten ferrous alloy is poured into a conventional sand mould at room temperature.

In accordance with the invention, a hollow core with a relatively small diameter, such as 1 to 3 centimeters or less, and a substantial length-to-diameter ratio, such as 3:1 to 20:1 or more, can be used in a conventional sand casting process to produce precision holes in the metal casting to close tolerances. The Core may have a small diameter such as 0.4 to 2 centimeter. Because the core has exceptional strength and resistance to viscous flow at 1500° C., the bow or deflection of the core is minimal even when the core has a length 10 or more times its diameter or cross sectional width (e.g., a total bow of 0.01 to 0.03 millimeters or less per centimeter of length). A typical core according to the invention has a wall thickness up to about one centimeter and a length at least 10 or 20 times its wall thickness and is capable or producing a precision hole in a steel casting which is substantially free of gas holes, inclusions, and other surface defects and which deviates from the desired cross-sectional dimensions by no more than 0.05 millimeters per centimeter along the length of the hole. The hole in the casting can be accurately formed even if it has intricate detail and, for example, can have 5 to 10 screw threads per centimeter of length to eliminate the need for drilling, tapping and other machining operations.

In making ferrous alloy castings according to this invention, it is important to provide a high degree of precision and to avoid gas holes and other surface defects in the cored holes of the casting. Gassing is avoided and the desired surface quality and precision are obtained by coating the core after it has been accurately machined to close tolerances to provide a thin continuous outer seal coat or barrier layer bonded to the core. This layer restricts or prevents substantial outward flow of expanding gases toward the molten metal in the mould cavity and causes the heated expanding gases or vapors to move radially inwardly to the central passage of the hollow core so that they can be vented to atmosphere. The barrier layer solves the gassing and core removal problems and make it possible to obtain precision internal cavities in the metal casting with excellent surface quality.

In accordance with the invention, the accurately machined cores are coated with fine particles of zircon, chromite, graphite, magnesite or other suitable refractory by spraying, dipping, brushing, dusting or other suitable process to form a continuous diffusion barrier layer having a thickness up to 200 microns and usually 40 to 100 microns or less. The particles preferably have an average particle size below 10 microns and are held in place by an organic binder or other suitable low-temperature binder.

When the core is employed for sand casting of iron alloys, such as cast iron, containing substantial amounts of carbon, the coating material is preferably graphite or a mixture of graphite and other refractories, such as zircon or magnesite. The coating on the surface of the precision ceramic core avoids leaching problems and otherwise facilitates core removal. Cylindrical cores with length-to-diameter ratios such as 3:1 or 4:1 can often be removed mechanically from the cast iron by a simple procedure in which the core is punched or forced out of the casting by an axial force.

The coated core of this invention provides a metal casting with an internal cavity having a surface of improved quality, and it is possible to form such a cavity with great precision because of the ability of the core to maintain its shape at high temperature. These advantages plus reasonable cost make it practical to eliminate expensive metal machining operations and to carry out precision foundry casting operations which heretofore would never be considered feasible.

The invention is revolutionary in the ferrous casting art because of a combination of outstanding functional advantages and tremendous reduction in cost of manufacture. When cores are mass produced by extrusion in accordance with the invention, great savings can be effected. The tooling costs for an extruded core may, for example, be one-tenth that of a comparable core made by high-pressure injection moulding.

BRIEF DESCRIPTION OF THE DRAWINGS

FIG. 1 is a schematic vertical sectional view to a reduced scale showing a conventional sand mould employing ceramic cores made according to the present invention;

FIGS. 2 and 3 are side and end views to a reduced scale showing one form of core made according to this invention which may be used in a sand mould, such as that of FIG. 1;

FIGS. 4 and 5 are side and end views to a reduced scale showing a modified form of core according to the invention;

FIGS. 6 and 7 are side and end views showing another form of hollow core according to the invention;

FIGS. 8 and 9 are side and end views showing another form of hollow core with machined threads;

FIG. 10 is a perspective view showing a hollow extruded core of rectangular cross section; and FIG. 11 is a perspective view showing another modified form of hollow extruded core with a polygonal cross section.

DESCRIPTION OF THE PREFERRED EMBODIMENT

The present invention relates to precision ceramic cores of exceptional high temperature strength especially adapted for commercial sand casting of iron alloys and steels, to a process of making the cores, to an improved core composition, and to a foundry process for quantity production of high quality ferrous alloy castings having precision cored holes formed to close tolerances.

The present invention is concerned with sand casting of ferrous alloys in said moulds. The term "sand" refers to a refractory material with grains having a size from about 0.1 to about 1 millimeter. A sand mould uses sand as a moulding material and may be formed of moulding sand, core sand or other sand together with a binder. Core sand is a mixture of sand and a binder, which may harden when heated to a temperature of 250° to 450° C.

The term "ferrous alloy" is used herein to mean an iron alloy or steel alloy which consists of iron and a small amount, such as 1 to 20 percent by weight, of carbon and various alloying elements. The ferrous alloy may, for example, be low-carbon steel, plain carbon steel, stainless steel, cast iron, ductile iron, malleable iron or the like.

A "sand casting" is a cast metal body or part made by a sand casting (or sand moulding) process, and such process may be green-sand moulding, dry-sand moulding, shell moulding or other sand moulding process, such as pit and floor moulding, cement-bonded sand, air-set sand, loam moulding or silicate of soda-$CO_2$ moulding.

A sand mould or core must have high permeability to permit escape of air and gas during casting. If the permeability is too low, gas holes are formed in the casting which cause it to be rejected as defective. The permeability of a mould or core can be measured on standard measuring apparatus, such as an AFS permeability testing apparatus, and an AFS permeability number can then be calculated. The term "permability number" is used herein to mean the number of minutes required for 2000 millimeters of air to pass through a specimen one square centimeter in cross section and one centimeter high under a pressure of 10 grams per square centimeter. A sand mould or sand core should have a permeability number of 50 to 250 in order to function properly.

The ceramic core compositions used in the practice of this invention employ grains of high-purity fused silica and finer particles of fused silica containing a mineralizer. The term "grains" is used herein to mean refractory pieces with a substantial particle size no less than 40 microns. As applied to silica, the term "fused" is used herein to mean vitreous or amorphous and the term "high purity" is used to mean a purity of at least 99.5 percent by weight.

The term "mineralizer" is well known in the ceramics art and refers to compounds which contain devitrifying ions (that is, ions which promote the conversion of vitreous silica to crystalline silica at a substantial rate), such as ions or alkali metals (for example, sodium or lithium) and/or alkaline earth metals, but excluding aluminum or metals less effective than aluminum in promoting conversion to the crystalline state.

The percentage of devitrifying ions referred to above, and all subsequent references to percentages of ions and metal impurities, are based on the weight of the ion or metal and not on the weight of metal oxide.

Unless the context shown otherwise, "parts" means parts by weight and all percentages are by weight.

Crystalline silica is subject to sudden crystallographic volume changes as it changes from the alpha to the beta form of vice versa. The term "alpha-beta inversion" is used herein to indicate such a change, for example, when the crystalline silica is heated above or cooled below the inversion temperatures.

In the preferred embodiment of this invention, the precision cores are formed by extrusion, and the core compositions employ plasticizers and/or tempering fluids to facilitate extrusion. The term "tempering fluid" is used herein to mean a liquid or fluid which provides the refractory mix with a consistency or plasticity suitable for extrusion. The term "plasticizer" or "plasticizing medium" is used herein to mean a material which improves the plasticity or flow characteristics of the refractory mix and includes cereals, waxes, clays, and various organic material which may also function as lubricants, low-temperature binders, or fillers.

The present invention involves the use of unique precision ceramic cores in sand casting processes used by ferrous foundries for casting of steel and iron alloys. The invention applies to all types of sand casting processes including green-sand moulding and shell moulding and particularly those in which molten ferrous metal at a temperature substantially above 1500° C. is poured into a mould at room temperature or at a temperature below 500° C. and allowed to flow around the core in the mould cavity. The sand casting process may employ various types of moulds includng those which use cope-and-drag moulding flasks as shown in FIG. 1.

The mould which receives the core of this invention is formed of sand and a suitable binder and is preferably formed by compacting the sand around a pattern having the shape of the desired metal casting. Most of the sand has a particle size from 150 to 300 microns, and the mould may have an AFS permeability number from 100 to 250 or greater. A conventional core sand or moulding sand may be used containing clays, binders and the like. The sand grains may be mixed with various organic or resin binders, and in some cases, the sand mould may be baked at temperatures up to 500° C. to harden the binders. A conventional silicate-$CO_2$ binder system may also be employed in the sand mould. The method of forming the sand mould used to receive the core is conventional and not essential to an understanding of the invention.

The core of the present invention is a hollow porous body formed predominantly of silica and capable of being removed from a ferrous casting by conventional leaching in caustic. It is specially designed for ferrous casting and contains a high percentage of vitreous silica in the refractory grains to improve thermal shock resistance and substantial amounts of cristobalite in the bond region between grains and adjacent the surface of the grains.

The core is formed from a plastic flowable refractory mixture comprising refractory particles, a mineralizer and an organic binder or other low-temperature binder which functions at room temperature or hardens at a temperature below 600° C. The refractory particles comprise at least 40 percent and preferably a major portion by weight of refractory grains with a particle size from 50 to 150 microns and preferably at least 20 percent by weight of fine vitreous silica particles with a particle size from 1 to 30 microns and preferably from 1 to 20 microns. At least 70 and preferably 80 to 99 percent by weight of the refractory grains of said mixture comprise vitreous silica, and the silica grains preferably have a high purity, such as 99.7 percent or higher. The mineralizer provides the refractory mixture with devitrifying metallic ions in an amount preferably at least 0.04 percent of the weight of the refractory particles.

The mixture contains plasticizers, fillers, lubricants, waxes or other materials which enable the mixture to reach the plastic or flowable state, with or without heating, and the plastic flowable mixture is shaped under pressure to compact the refractory grains and to form a green core. The core may be made by high-pressure injection moulding, but much greater cost savings are effected by employing an extrusion process. The green core is then fired for a substantial period of time at high temperature, such as 1000° to 1200° C., sufficient to eliminate combustibles and to cause extensive devitrification in the bond region between the grains. The proportions of the fine silica particles, organic binder and mineralizer in the refractory mixture are chosen such that the fired core has a porosity of from 25 to 55 volume percent, contains substantial amounts (e.g., 15 to 30 percent by weight) of insitu-formed cristobalite, and has high resistance to viscous flow and a high modulus of rupture at 1500° C. as hereinafter described. The firing may be carried out in one or more stages and the fired core or extrusion may be machined, dipped or coated prior to the last heating or drying step.

The organic binder employed in the refractory mixture provides the core with the needed green strength prior to firing and the fine particles of vitreous silica serve as the high temperature binder. Such fine silica particles are preferably the principal high-temperature binder but lesser amounts of other high-temperature binders may be used, especially if the core is to be formed by injection moulding. The binder should be capable of providing the fired core with very high strength at room temperature as hereinafter described.

After the final heating step, the fired core is suitable for use by a foundry in sand casting of ferrous alloys poured at temperatures of 1600° C. and higher. The core may, for example, be used in a conventional sand mould, such as the mould A of FIG. 1, which is of a type used by ferrous foundries for quantity production of steel and iron alloy castings.

As shown, the sand mould A is of conventional construction and includes a rigid generally rectangular metal flask 2 with an upper half or cope 3 and a lower half or drag 4 having a flat bottom plate 5. The flask has lugs 6 and 7 and locating pins 8 for aligning the cope and drag and holding them in position. The moulding sand is compacted around the pattern to form the sand portions 9 and 10 of the mould and to define a mould cavity 11 with a size and shape corresponding to that of the pattern. As shown, a pair of identical refractory cores 12 are placed in enlarged portions 13 and 14 positioned in the sand mould (e.g., at the core prints).

Each of the cores 12 may be a precision ceramic core made according to the present invention. FIGS. 2 to 11 show various types of cores which may be used in the practice of the invention. The drawings are substantially to scale and the cores may be made to the proportions shown, but it will be understood that the sizes and shapes may vary considerably and that other types of cores may also be used.

FIGS. 2 and 3 show a precision ceramic core 20 with a length more than eight times its diameter having a cylindrical intermediate portion 21, cylindrical end portions 22 and 23 of reduced diameter and a cylindrical bore 24 extending the full length of the core. The core is formed by extrusion, fired and thereafter machined to the desired shape. A hollow core of this type may have a length at least 10 times its diameter at 21 and usually has a maximum external diameter from 1 to 3 centimeters and a hole 24 with a diameter no more than half the external diameter and such that the minimum wall thickness is from 4 to 10 millimeters.

FIGS. 4 and 5 show another form of hollow ceramic core 25 with a length-to-diameter ratio much greater than that of the core 20 which is capable of forming precision holes in steel or iron alloy castings which could not be cast prior to the present invention. The core 25 has a length more than 20 times its diameter and comprises a main cylindrical portion 26, a cylindrical portion 27 of smaller diameter, and a cylindrical hole 29 extending the length of the core. The hole 29 is formed by extrusion of the core and the portions 26 and 27 are accurately machined to the desired diameter. The portion 26 has an intermediate portion 28 machined to provide screw threads which are reproduced in the casting. For example, 5 to 10 threads may be provided for each centimeter of length.

A small hollow core of the type shown in FIG. 4 may, for example, have a maximum diameter at 26 from 6 to 20 millimeters and a wall thickness from 3 to 10 millimeters. The hole 29 has a diameter which is preferably no more than one-third the external diameter and may, for example, be from 2 to 5 millimeters or less when the diameter of portion 26 is less than 15 millimeters.

Because of its small mass, the core 25 can be heated from room temperature to above 1500° C. within a few seconds when it contacts molten steel in the mold cavity. In order to avoid substantial deformation or breakage due to buoyant and inertia forces applied by the molten metal, the core preferably has a modulus of rupture of at least 60 and more preferably at least 80 kilograms per square centimeter at 1500° C. This makes it possible to produce precision holes in the metal casting with minimum bowing of the core, and the total bow can be limited to no more than 0.03 millimeter per centimeter of length even when the core is in a horizontal position during casting.

FIGS. 6 and 7 illustrate still another type of core which can be employed in the practice of this invention. The core 30 has a venturi portion 31 which is tapered in two directions and increases in diameter from the throat towards the adjacent cylindrical portions 32 and 33 of the core. A short cylindrical end portion 34 of reduced diameter extends outwardly from portion 32, and an axially elongated cylindrical end portion 35 extends outwardly from portion 33. The hole 36 formed during extrusion of the core extends the full length of the core and has a diameter preferably no more than one-third that of the neck 37 where the wall thickness is the smallest. The core 30 is formed by extrusion and then machined to the desired shape. This minimizes the cost of production.

FIGS. 8 and 9 show another form of machined, extruded core according to the invention. The core 40 has a generally cylindrical threaded portion 41 with five to ten screw threads per centimeter of length and cylindrical end portions 42 and 43 extending outwardly from the portion 41 and having a diameter less than the inside diameter of the threads. The cylindrical hole 44 extends the full length of the core and has a diameter no greater than half and preferably no greater than one-third that of the cylindrical portion 44.

The extrusion process improves the core by bringing the smaller refractory grains to the surface and also makes it possible to produce various non-circular or polygonal cross sections. FIG. 10 shows an extruded core 45 formed according to the invention and having a uniform square cross section throughout its length and a hole 46 of square cross section. FIG. 11 shows an extruded core 47 with a hexagonal cross section and a cylindrical hole 48 extending the length of the core.

Each of the precision ceramic cores of FIGS. 2 to 11 can be accurately formed to close tolerances by grinding, cutting and/or other simple machining operations, and can be used in a sand mould of the type shown in FIG. 1 or in various other sand moulds. The cores are heated above 1500° C. for substantial periods of time before the molten ferrous alloy solidifies because the wall thickness of the core is less than the thickness of the surrounding metal sections and often less than half the latter metal thickness, but the cores have adequate strength to maintain their shape and resist the high buoyant and ineria forces exerted by the molten metal.

Great savings can be effected by use of the precision extruded silica cores of this invention in conventional foundry sand casting of ferrous alloys because of the elimination of expensive metal machining operations such as drilling, boring, broaching, reaming, and the like. The extrusion process minimizes the cost of making the cores, and machining of the core is relatively expensive. Extruded cores of circular cross section, such as the cores 20, 25, 30 and 40, are well suited to centerless grinding operations which minimize machining costs.

In order to enable the cores to withstand the severe conditions encountered in the casting of steel and iron alloys, it is necessary to maintain proper control over the ingredients used in the core composition and the particle size of the refractories and to control the amount of cristobalite formed during firing. Unwanted impurities, for example, can result in excessive devitrification and provide a core with inadequate thermal shock resistance. Unlike the larger silica grains, the fine silica used as the binder for the refractory grains need not have a high purity, but the amount of devitrifying metallic ions should be kept within predetermined limits. The process of the present invention employs a refractory core composition containing a mineralizer providing devitrifying ions which promote the formation of cristobalite, and the amount of mineralizer is controlled to limit the amount of cristobalite formed in the refractory grains.

The mineralizer used in the practice of this invention preferably provides, as devitrifying ions, alkali metal ions, such as potassium, sodium or lithium, or alkaline earth metal ions, such as barium, calcium or magnesium. Sodium ions are preferred because of their higher rate of diffusion. The mineralizer may be a salt, an oxide, a silicate, a nitrate, a borate or other compound of an alkali metal or alkaline earth metal (for example, sodium acetate, sodium chloride, sodium carbonate, sodium silicate, lithium silicate, potassium silicate or magnesium silicate) and it may also be another refractory (such as silica, zircon, zirconia or alumina) which contains a minor amount of devitrifying ions. When the mineralizer is an alkali metal silicate, it may be made in any suitable manner and may have an $SiO_2:M_2O$ mole ratio (in which M is an alkali metal) of from 1:2 to 4:1, for example, as disclosed in U.S. Pat. No. 3,918,921.

The refractory mineralizer particles are preferably relatively pure except that they contain devitrifying ions. A preferred amount of devitrifying ions is at least 0.1 percent, more preferably at least 0.2 percent, based on the weight of the mineralizer. The percentage by weight of devitrifying ions in the mineralizer particles is preferably at least several times the percentage of such ions in the particles of high purity vitreous silica, such as up to one percent, based on the weight of the mineralizer.

The refractory particles of the core composition used in the practice of the invention preferably contain at least one percent by weight, more preferably at least 2 percent by weight, of the mineralizer particles, which preferably have an average particle size of not more than 30 microns, more preferably not more than 10 microns. For example, excellent results can be obtained where the refractory particles of the core composition comprise 80 to 98 percent by weight of the high purity vitreous silica and 2 to 20 percent by weight of refractory mineralizer particles containing at least 0.2 percent by weight of devitrifying ions.

A preferred mineralizer comprises treated particles of fused silica or other suitable refractory having a small particle size and containing devitrifying ions concentrated near the surfaces of the particles. Where the mineralizer is colloidal silica or a silica-producing material containing the devitrifying ions, it is possible to produce a core containing more than 98 percent by weight of silica.

The preferred mineralizer particles are of fused silica or other suitable refractory particles treated with an alkali metal compound or alkaline earth metal compound to provide cristobalite-promoting devitrifying ions concentrated near the outer surfaces of the particles. Excellent mineralizers are the commercial sodium-stabilized colloidal silicas sold as a liquid suspension under the Trade Marks "Ludox", "Syton" or "Nalcoag". These commercial colloidal silicas have an average particle size substantially less than 30 millimicrons and a solids content of from about 30 to about 40 percent by weight, and contain a predetermined amount of sodium which is closely controlled by the manufacturer. A typical "Ludox" colloidal silica may, for example, have an average particle size of 14 to 17 millimicrons and an $SiO_2/Na_2O$ mole ratio of 90 to 95.

The amount of mineralizer employed in the mixture to be moulded depends on the type of mineralizer and on the amount of devitrifying ions lost by evaporation during firing of the core. If the mineralizer is a sodium silicate containing, for example, 20 or 30 percent by weight of sodium, then the amount thereof may be only 0.5 to 2 percent by weight. If the mineralizer comprises activating refractory particles, such as dried sodium-stabilized colloidal silica, a larger amount is preferred. Generally the mineralizer comprises 1 to 20 percent of the weight of the core.

The preferred amount of the devitrifying ions in the core depends on the type of metal and is at least 0.3 percent by weight. If the mineralizer provides sodium ions, the total amount of sodium in the fired core is preferably 0.04 to 0.1 percent. If the mineralizer provides lithium or potassium ions, rather than sodium ions, then the preferred total amount of lithium or potassium in the fired core is preferably 0.04 to 0.2 percent.

A typical high-purity vitreous silica would contain less than 100 parts per million of alkali metals and less than 500 parts per million of alkali earth metals as natural impurities. Such vitreous silica is preferred in the present invention because it provides the core with better refractoriness than can be obtained with a silica containing larger amounts of devitrifying metallic ions.

The fired core preferably contains at least 90 percent by weight of silica, but zircon and zirconia can be tolerated in substantial amounts because they have less tendency to reduce refractoriness than alumina and other metal oxides. Generally, the fired core should contain no more than five percent, preferably less than two percent by weight of alumina, and no more than ten percent, more preferably no more than five percent by weight of refractories other than silica, zircon and zirconia.

If the core contains a small amount, such as five to ten percent by weight of a refractory, other than silica, such refractory is preferably zircon but other refractories might be included in the core composition.

When it is desired to form a core containing a high percentage of silica, the core composition can contain silica-forming materials as well as the vitreous silica particles. Various silica-forming materials may be employed including liquid thermosetting phenyl lower alkyl siloxane resins of the general type disclosed in U.S. Pat. Nos. 3,108,985 and 3,126,357. There are well known in the art and are converted to silica upon heating to a temperature above 1000° C.

The refractory mixture or core composition used to form green cores in the practice of this invention is basically comprised of refractory material, a mineralizer, an organic binder or low-temperature binder, and a plasticizer or other ingredients which make possible formation of a flowable mixture suitable for extrusion, high-pressure injection moulding or other pressure forming process. The refractory material comprises refractory grains with a particle size from 40 to 200 microns and preferably 50 to 150 microns and a siliceous binder located in the bond region between grains. The siliceous binder includes fine silica particles with a particle size up to 30 microns which serve in the fired core as the principal high temperature binder or the sole binder. Such fine silica particles comprise at least 20 and preferably at least 30 percent of the weight of the refractory material in the refractory core mixture and have an average particle size preferably no greater than 20 microns. The fine silica particles are principally vitreous silica and may contain small amounts of another refractory, such as zircon, quartz or other crystalline silica, but a very high percentage of vitreous silica is preferred. Part of the silica may be of colloidal size and part may be mineralizer particles as previously described.

The amount and size of the fine vitreous silica particles is selected to achieve the desired rate of devitrification of such particles in the bond region relative to that in the larger refractory grains during firing and also to provide the fired core with a high modulus of rupture at ambient temperature (e.g., a modulus of rupture of 100 to 150 kilograms per square centimeter at 25° C.). To achieve this with a reasonable firing time, the refractory core mixture is preferably provided with at least 20 parts of fine vitreous silica particles with a particle size from 1 to 20 microns per 100 parts by weight of refractory material, and said fine particles preferably include at least 10 parts by weight of particles with a particle size from 0.1 to 10 microns.

In an extrudable refractory core mixture, the grain size and the amount and particle size of the fine particles are preferably chosen to facilitate extrusion. A majority of the refractory grains preferably have a particle size less than 100 microns in an extrudable mix. For example, in an extrudable refractory core mixture, the refractory particles, which comprise 70 to 95 or more percent by weight of vitreous silica, contain at least 40 and preferably 50 to 70 percent by weight of refractory grains with a particle size from 50 to 150 microns and contain at least 20 percent by weight of fine vitreous silica particles with a particle size from 1 to 20 microns. At least 40 percent by weight of said refractory particles preferably have a particle size not in excess of 100 microns.

The extrudable core mixture preferably includes a number of ingredients in addition to the organic binder and mineralizer to facilitate extrusion, such as bentonite, ball clay, cereals, extrusion aids, lubricants, fillers, plasticizers and the like. If clays are used, the maximum amount is preferably 5 percent and more preferably 3 percent or less based on the weight of the refractory material to limit the amount of aluminum compounds in the fired core and to facilitate leaching. The total amount or organic binder or other organic material in the core mixture is preferably no more than 25 percent and the amounts of plasticizers, fillers and inorganic binders is usually limited to a minor amount, such as 10 percent or less, based on the weight of the refractory to the mixture, but it will be apparent that the compositions can vary substantially.

A typical extrudable core composition according to this invention may, for example, contain 5 to 15 parts of an organic or synthetic low-temperature binder, 1 to 5 parts of clay, 2 to 20 parts of a mineralizer and 2 to 5 parts of a cereal per 100 parts by weight of refractory particles and may also contain other ingredients such as up to 5 parts of a conventional extrusion aid or up to 10 parts of a plasticizer. The cereal can facilitate extrusion when the batch or mixture is tempered with a tempering fluid, such as water. For example, the refractory core composition can be mixed with 5 to 20 percent by weight of water. It will be understood that the core composition will be mixed with an amount of tempering fluid, plasticizer and/or plasticizing medium sufficient to provide an extrudable consistency before it is fed to an extrusion apparatus. Substantial amounts of these materials are required for this purpose because of the difficulty involved in extruding a material such as silica.

When the core of this invention is formed by a process other than extrusion, such as injection moulding, the core composition may be somewhat different and will not require large amounts of water. In that event an organic vehicle or a wax may be appropriate to provide a plastic mix and a high temperature binder may be desirable in addition to the fine silica particles.

Whether or not the core is extruded, it is preferable to employ an organic binder. Ethyl silicate binders are not appropriate. Sodium silicate is not a preferred binder but can be used as a mineralizer. Suitable binders include linseed oil, low melting gums, waxes, polyterpenes, ethyl cellulose, shellac, polyethylene, polypropylene, polyvinyl acetate, and polystyrene.

In the preferred embodiment of this invention, the refractory core composition or mixture is thoroughly mixed in suitable mixing apparatus to an extrudable consistency and then placed in an extrusion press where it is continuously extruded under a high pressure, such as 1500 to 2500 pounds per square inch, to form a hollow tube of uniform cross section. The extrusion press may be of the screw type or may have a reciprocating ram. If it is of the latter type, it is preferable to raise the ram and apply a vacuum to remove trapped air bubbles.

The tubular extrusion leaving the extrusion apparatus is cut into smaller sections before it is heated, for example to lengths of 0.6 to 1.5 meters. The cut pieces are placed on a straight support and allowed to dry at temperatures, such as 20° to 80° C., for a substantial period of time. At room temperature the drying time can be several days.

After drying the hollow extrusions are very strong and can have a modulus of rupture at room temperature of 60 to 90 kilograms per square centimeter. They are then cut to shorter lengths, such as 12 to 25 centimeters, to form hollow green cores which are fired at a temperature of at least 1000° C. for a period such as to produce porous cores with the desired degree of devitrification having a modulus of rupture at 1500° C. above 50 and preferably 60 to 80 kilograms or more per square centimeter. The green core, may for example, be fired for 1 to 2 hours or more at a temperature of 1100° to 1300° C. to form 20 to 30 percent by weight of cristobalite or more and then cooled to room temperature.

Before the hollow extruded cores are used for casting metal, they can be ground or otherwise machined to provide the desired shape and to provide a high degree of accuracy. The machined cores are then coated with particles of a suitable refractory, such as graphite, magnesite or zircon, as previously indicated.

The coating may be applied by spraying, dipping, brushing or otherwise and then dried by heating to eliminate water or volatile solvents. Final drying can be carried out at temperatures from 200° to 500° C. Additional firing at temperatures of 1000° C. and higher is preferably avoided since impurities can cause unwanted devitrification at the core surface.

While the percentage of cristobalite can be increased by dipping a porous fired core in a liquid or slurry containing a mineralizer, and thereafter firing the core to a devitrification temperature, this procedure is uneconomical, unreliable and undesirable. It can produce defective casting because of excessive devitrification at the surface of the core. It is important in the practice of the present invention to control the amount of cristobalite formed in the core so that excessive damage will not result due to thermal shock or due to sudden volume changes during the crystallographic alpha-beta inversion.

An example of a suitable composition for making extruded cores is indicated below:

| Ingredients | Parts by Weight |
| --- | --- |
| Zircon (−200 Tyler mesh) | 0–10 |
| Vitreous silica (total) | (90–100) |
| (a) 40 to 100 microns* (aver. 60 to 70 microns) | 40–60 |
| (b) 10 to 40 microns | 20–40 |
| (c) below 10 microns (aver. 0.5 to 4 microns) | 10–30 |
| Colloidal silica (sodium content 0.5 to 1 percent) | 1–7 |
| Clays | 2–5 |
| Cereal Flour | 3–7 |
| Low-temperature binder | 0–5 |
| Extrusion aid | 0–1 |

*particle size of silica

All of the dry ingredients can be mixed in a blender and thereafter mixed with water in a batch-type or continuous-type muller to provide an extrudable consistency. The water serves as a tempering fluid and may be added with the sodium-stabilized colloidal silica (e.g., "Ludox"). The total amount of liquid in the resulting mix may, for example, be 15 to 30 volume percent and is commonly 25 volume percent or higher. The colloidal silica may have an average particle size from 10 to 20 millimicrons.

It is preferable to omit the zircon and to employ high-purity (−200 mesh) vitreous silica in the core composition so that the fired core will have a silica content of 96 to 99 percent or higher. Bentonite, ball clay and other conventional clays suitable for extruded core manufacture may be used, but the amounts should be limited to avoid leaching problems.

The amount of sodium-containing colloidal silica is preferably sufficient to provide at least 600 parts per million of sodium ions, and the total amount of sodium or other devitrifying metallic ions in the core is preferably 0.05 to 0.12 percent of the weight of the refractory particles or at least sufficient to permit formation of a fired core containing 15 to 30 percent by weight of cristobalite and having a high creep resistance at high temperature (e.g., a viscosity of 20 to 40 times $10^{11}$ poises or more at 1400° C.).

The amount of water or other tempering fluid is selected to provide the mix with the proper consistency so that the mix can be extruded in conventional equipment to the desired tubular shape (see U.S. Pat. No. 3,720,867).

Various plasticizers and plasticizing binders may be used to facilitate formation of an extrudable mix as is known in the art. Clays are desirable to facilitate extrusion but can be omitted. Various extrusion aids are commercially available and very effective but their use is optional.

The particle size of the vitreous silica used in the above recipe can, of course, be varied somewhat without seriously affecting the porosity and permeability of the fired core. Generally it is preferable to avoid particles with a size in excess of 100 microns but small amounts can be tolerated when forming cores by extrusion. A higher percentage of silica particles in the range of 50 to 100 microns or higher is desirable in improving the permeability of the core but cost considerations can result in use of commercially available silica which does not have an optimum particle size distribution (e.g., conventional −200 mesh fused silica with major amounts of particles with a size less than 25 microns). High quality cores may, for example, be made as indicated below using the following composition:

| Ingredient | Parts by Weight |
| --- | --- |
| Vitreous silica, 25 to 75 microns (−200 mesh) | 45 |
| Vitreous silica, up to 25 microns | 45 |
| Vitreous silica, 0.1 to 10 microns | 10–12 |
| Ball clay | 1.6–1.8 |
| Bentonite | 0.8–1.0 |
| Extrusion aid | 0–0.2 |
| Cereal flour | 5–6 |
| Sodium-stabilized colloidal silica, (dry weight) (particle size below .05 microns) | 1.5–5 |

The silica, ball clay, bentonite, cereal flour and other dry ingredients are blended in a convention twincone blender and then placed in a conventional Simpson muller. Water and wet colloidal silica (e.g., "Ludox") are added to provide a total liquid of about 29 to 30 percent and the materials are thoroughly mixed to an extrudable consistency.

The mix is then placed in a conventional extrusion press, and a continuous hollow tube is extruded, for example a tube of circular cross section having an external diameter of 0.7 to 1.2 inches. The extrusion is cut to a suitable length, such as one meter, placed on a straight rigid support, and allowed to dry for 4 to 5 days at room temperature and to develop high strength. After drying it may have a high modulus of rupture at 25° C. such as 80 kilograms or more per square centimeter. The dried hollow extrusion is then cut to a shorter length, such as 15 to 20 centimeters, and fired at about 1160° to 1170° C. for 70 to 80 minutes or so to obtain a fired hollow tube containing 20 to 30 percent by weight of crystalline silica (i.e., cristobalite).

The fired tube is cooled to room temperature and then cut or machined to form a core of a predetermined size and shape such as illustrated in the drawings. The final machining can be effected in a conventional centerless grinder using conventional procedures to provide very close dimensional tolerances. This can minimize or substantially eliminate bow in the core.

The machined core is thereafter coated with a suitable refractory material such as zircon, magnesite, chromite, graphite, or mixtures thereof by dipping, brushing, spraying, dusting or otherwise and dried as hereinafter described.

When made from the above formulation, the finished core has a porosity of at least 30 volume percent, a very high strength at room temperature as previously indicated, and a modulus of rupture at 1500° C. of more than 60 kilograms per square centimeter at 1500° C.

The vitreous silica used in the aove formulation may have a purity in excess of 99.7 percent. If desired, a common commercial as-ground fused silica may be used containing a substantial proportion of fines with a particle size from 0.1 to 20 microns, such as a conventional −200 Tyler mesh vitreous silica. Ninety parts of the latter (for example, Glasrock P1W silica) may be mixed with about ten parts by weight of fine silica having a particle size of 0.1 to 10 microns in the above formulation.

The same commercial −200 mesh silica containing up to 50 percent by weight of particles below 25 micron size can be subjected to air separation to separate out the fines when it is desired to improve the permeability of the core. However, the core composition does require a minimum amount of fine silica to serve as the higher temperature binder for the refractory grains.

A finished hollow core made according to the above example and having a length 10 to 20 times its diameter may be placed in a conventional sand mould, such as that shown in the drawing, and used to cast stainless steel or other steel poured at a temperature of 1600° C. to 1650° C. without serious problems due to spalling, core breakage or dimensional inaccuracy. The sand mould may be of any type commonly use for casting steel or iron alloys and employing a conventional organic or low-temperature binder. The sand mould may be heated if a heat-setting resin binder is employed. The refractory particles of the sand mould may consist of quartz sand having an average particle size of 150 microns or more so as to provide the high permeability needed to avoid gassing problems (e.g., an AFS permeability number from 150 to 250 or higher).

The hollow extruded cores of the above example have adequate thermal shock resistance and resistance to deformation at casting temperatures to permit mass production casting of steel and iron alloys, including stainless steels, using metal pouring temperatures well above 1600° C. even when the portions of the metal casting surrounding the hollow core have a thickness several times the wall thickness of the core. The core may, for example, have a wall thickness less than 0.3 inch and still maintain its shape until the molten metal solidifies. Also the core has adequate thermal shock resistance to withstand heating from below 100° C. to above 1500° C. in less than 2 seconds.

A procedure of the type described above can be employed to produce high-strength extruded ceramic cores well suited for ferrous casting containing around 97 percent by weight of silica and around three percent by weight of aluminum oxide and having an apparent specific gravity of around 2.3 grams per cubic centimeter and an apparent porosity of around 33 percent. These cores can be removed from the casting by leaching in caustic. The external coating is important to avoid core removal problems and casting defects and serves to cause gases to move radially inwardly to the central vent passage of the core.

The coating is a diffusion barrier layer with a thickness up to 200 microns and preferably about 40 to about 100 microns formed from fine refractory particles having a particle size from 0.1 to 20 microns or less and having an average particle size below 10 and preferably 1 to 6 microns. A binder is employed to hold the particles in position, such as a conventional organic binder or low-temperature binder. Colloidal silica may be used as the sole binder or as an auxiliary binder. The preferred coating materials are zircon, magnesite, chromite, graphite or mixtures thereof but graphite can be undesirable when casting steel or low-carbon alloys.

An example is given below to illustrate how the cores of this invention and the above examples may be coated to make them suitable for casting of steel in sand moulds. A coating composition may be prepared substantially in accordance with the following recipe:

| Ingredient | Parts by Weight |
| --- | --- |
| Zircon (or other refractory) | 35–40 |
| Organic binder (Seaspen) | 0.4–0.5 |
| Water | 50–55 |
| Colloidal silica (dry basis) | 4–7 |

The refractory may be zircon, magnesite, chromite or graphite with a small particle size (e.g., −400 mesh), and various organic binders may be used in various amounts. If a heavy refractory is used, such as zircon, a conventional suspending agent is desirable and a preferred binder is "Seaspen" which functions as both a binder and a suspending agent. Seaspen is a calcium alginate made from seaweed and is commonly used in ceramic slurries containing zircon (e.g., for making shell moulds). If other organic binders are used, it may be necessary to employ a suspending agent such as hydroxy ethyl cellulose or hydroxy methyl cellulose.

The colloidal silica in the above recipe preferably has an average particle size in the range of 10 to 30 millimicrons and may be used in amounts from 2 to 10 parts by weight depending on the amount of organic binder employed.

If the refractory is zircon or magnesite, the average particle size is preferably 3 to 10 microns. If part or all of the refractory in the above recipe is graphite, the particle size may be much smaller.

The above recipe provides a slurry in which the cores of the previous example can be dipped to provide the desired coating. After dipping, the core is heated to 80° to 100° C. or higher until it is dry. Because the coating is substantially uniform, it is generally unnecessary to machine or treat the surface of the coated core before it is used. However, if extreme accuracy is needed, further surface treatment may be in order including mechanical or electrochemical machining or finishing operations. If the core is threaded, brushing may be desirable in the threaded areas to provide a more uniform coating.

The amount of liquid employed in the above recipe is selected to provide a coating of a suitable thickness (e.g., 40 to 100 microns) when the core is dipped and dried in the vertical position. After the core has been dried sufficiently to obtain green strength, further drying can be effected at a temperature of 80° to 250° C. for up to 2 hours or so, for example using vacuum drying or forced air drying.

Solvent systems may also be employed when applying the barrier coat to the core. The particle size of the zircon, magnesite or other refractory may be the same as in the aqueous system and the amount of liquid is again selected to provide the coating of the desired thickness when the core is dipped and dried. Again an organic binder or low-temperature binder would be employed. Various solvents can be used, such as ethyl alcohol or 1,1,1-thichloroethane.

If colloidal silica or colloidal alumina is used as a binder, the amount is preferably no more than 10 percent by weight. A commercial colloidal silica may be used such as Nalco 1129 having an average particle size of about 15 to 17 millimicrons and suspended in isopropyl alcohol. Such a binder may, for example, be used with a refractory, such as magnesite or zircon, as the sole binder or may be used with an organic binder. In an aqueous system, the colloidal silica binder may be "Ludox".

An excellent coating for a core to be used in sand casting of gray cast iron or other cast iron can be made using a mixture of equal parts of magnesite and graphite in a trichloroethane solvent containing an organic binder. The magnesite may, for example, have a particle size in the range of 1 to 50 microns and an average particle size of from about 8 to 12 microns. The graphite may have a particle size up to 30 microns and an average particle size below 5 microns and may include substantial amounts of colloidal graphite, if desired. The coating may, for example, be applied uniformly to the core to a thickness of about 60 to 100 microns. In some cases the core will produce castings have a better surface finish if the coating is heated to 230° to 250° C. However, solvent systems permit drying the coating at room temperature.

It will be understood that the organic binders may be heat-setting resins or the like requiring heating of the core above 200° C.

While it is more economical to apply a single barrier coat to the core, it will be understood that two or more similar or different coats may be applied. The overall thickness of the coatings should not be excessive and is preferably below 200 microns. The optimum thickness depends on the size and shape of the core, the type of metal being cast, and the dimensional tolerances being sought.

While the refractory material in the cores of the present invention preferably comprise major amount of vitreous silica grains with a particle size from 40 to 150 microns, advantages of the invention can be obtained with larger grains. Likewise there can be some variation in the amounts of fine silica or other binders used to hold the grains together and in the strength of the cores at different temperatures.

Standard test methods may be used for determining the modulus of rupture of cores made according to the present invention, such as those recognized by the American Society for Testing and Materials or equivalents thereof. For example, the modulus at room temperature may be determined by the standard method having ASTM designation C369-56 and the modulus at elevated temperature may be determined by a method having designation C583-67 or a substantially equivalent method. Standard creep strength tests may be used to determine the viscosity of the core at elevated temperatures.

Unless the context shows otherwise, temperatures mentioned herein are in degrees Celsius, dimensions are in metric units, and proportions or percentages are by weight rather than by volume.

It will be understood that, in accordance with the provisions of the patent laws, variations and modifications of the specific compositions and methods disclosed herein may be made without departing from the spirit of the invention.

What is claimed is:

1. A hollow extruded and fired ceramic core for sand casting of ferrous alloys consisting essentially of refractory material and a mineralizer and having a modulus of rupture at 1500° C. of at least 60 kilograms per square centimeter and a porosity of 25 to 55 volume percent, said refractory material comprising 50 to 70 percent by weight of refractory silica grains with a particle size of 50 to 150 microns bonded together by insitu-formed crystalline silica, wherein said silica grains comprise at least 80 percent by weight of partially devitrified high-purity silica and 5 to 15 percent by weight of crystalline silica concentrated near the outer surface portions of the grains, the percentage by weight of crystalline silica in the bond region between grains being at least several times that in said grains, said refractory material further comprising at least 20 percent by weight of fine vitreous silica particles with a particle size up to 20 microns, and at least 15 percent by weight of the refractory silica particles having a particle size less than 10 microns.

2. A precision extruded and fired ceramic core according to claim 1 having a cross-sectional width of 0.4 to 2 centimeters, a length at least several times its width, and a wall thickness no greater than 1 centimeter and having a high temperature strength and permeability suitable for precision sand casting of ferrous alloys poured at a temperature at least 1500 degrees C. higher than the temperature of the core.

3. A precision extruded and fired core according to claim 1 having a modulus of rupture of at least 100 kilograms per square centimeter at 25° C., a wall thickness no greater than one centimeter, and a length at least 10 times its wall thickness.

4. A precision extruded and fired core according to claim 1 having a maximum diameter no greater than two centimeters and a length at least 10 times its maximum diameter.

5. A precision extruded and fired core according to claim 1 having a length at least 20 times its external diameter.

6. A precision extruded and fired core according to claim 1 or 2 wherein said core has a wall thickness no greater than 1 centimeter and a length at least 20 times said wall thickness.

7. A precision extruded and fired core according to claim 1 having an exterior threaded surface with a diameter no greater than 2 centimeters containing 4 to 10 screw threads per centimeter of length.

8. A hollow extruded are fired ceramic core according to claim 1 formed from a mixture comprising refractory particles, a mineralizer and a binder, wherein said refractory particles comprise at least 50 percent by weight of vitreous silica grains with a particle size of at least 50 microns and at least 20 percent by weight of fine vitreous silica particles with a particle size up to 20 microns, and wherein said core comprises a hollow rod with a wall thickness not in excess of 1 centimeter and a length at least 10 times said wall thickness having a viscosity of from about 20 to about 40 times $10^{11}$ poises at 1400° C.

9. A hollow extruded and fired ceramic core according to claim 1 or claim 8 having a thermal shock resistance so high that it withstands rapid heating by a molten ferrous alloy from a temperature below 100° C. to a temperature above 1500° C. in less than two seconds without producing defective castings.

10. A hollow extruded and fired ceramic core according to claim 8 having an external surface machined to close tolerances and covered by a diffusion barrier layer with a thickness of from 40 to 100 microns.

11. A hollow extruded and fired ceramic core according to claim 8 wherein at least 95 percent by weight of the refractory material is silica.

12. A mould for sand casting of ferrous alloys comprising a rigid flask containing a shaped permeable mass of sand, grains surrounding a mould cavity and a rigid extruded and fired ceramic core body mounted in a fixed position in said mold cavity, said extruded core body being formed from an extrudable composition comprising refractory particles, a mineralizer, an organic binder, a plasticizer and a tempering fluid, said refractory particles comprising from about 50 to about 70 percent by weight of vitreous silica grains with a particle size from 50 to 150 microns and at least 20 percent by weight of fine vitreous silica particles with an average particle size of from 1 to 10 microns, the silica grains of the fired core body of said mould assembly comprising at least 80 percent by weight of shock-resistant vitreous silica and at least 5 percent by weight of cristobalite concentrated near the outer surface portions of the grains, the percentage by weight of crystalline silica in the bond region between grains being at least several times that in said grains said core body having a modulus of rupture of at least 60 kilograms per square centimeter at 1500° C. and a porosity of at least 25 volume percent.

13. A mould assembly of the character described for casting of steel and iron alloys comprising a sand mould having a shaped permeable mass of sand grains surrounding a mould cavity and a rigid hollow permeable ceramic core body mounted in a fixed position in the mould cavity, said core body being substantially free of combustible material and consisting essentially of refractory grains bonded together by a sintered silica binder comprising a major portion by weight of insitu-formed crystalline silica, said refractory particles comprising at least 50 percent by weight of vitreous silica grains with a particle size of at least 50 microns and at least 20 percent by weight of fine vitreous silica particles with a particle size up to 20 microns, at least 15 percent by weight of the refractory particles having a particle size less than 10 microns, said core body after firing being in the form of a hollow rod with a wall thickness less than that of surrounding portions of the mould cavity which receives the metal to be cast and with a length at least 10 times its wall thickness and having a porosity of at least 25 volume percent and a modulus of rupture at 1500° C. of at least 60 kilograms per square centimeter, the silica grains of the fired core body comprising at least 80 percent by weight of vitreous silica and at least 5 percent by weight of cristobalite concentrated near the outer surface portions of the grains, the percentage by weight of crystalline silica in the bond region between grains being at least several times that in said grains.

14. A mould assembly of the character described for casting of steel and iron alloys comprising a sand mould having a shaped permeable mass of sand grains surrounding a relatively large mould cavity and a relatively small permeable ceramic core body extending into the mold cavity, said sand grains being held together by an organic binder, said core body containing at least 90 percent by weight of silica and consisting essentially of refractory grains bonded together by a sintered silica binder comprising a major portion by weight of insitu-formed crystalline silica, said refractory particles comprising a major portion by weight of refractory grains with a particle size of from 50 to 150 microns and at least 20 percent by weight of fine vitreous silica particles with a particle size up to 20 microns, said core body being in the form of a fired rigid extruded hollow rod with a wall thickness less than the thickness of the surrounding portions of the mould cavity which receives the metal to be cast and with a length at least 10 times its wall thickness and a porosity of at least 25 volume percent and having a modulus of rupture at 1500° C. of at least 60 kilograms per square centimeter, the silica grains of the fired core body comprising at least 80 percent by weight of vitreous silica and at least 5 percent by weight of insitu-formed crystalline silica concentrated near the outer surface portions of the grains to resist deformation of the grains at temperatures above 1600° C., the vitreous silica of said grains providing the core body with a resistance to thermal shock such that it can withstand rapid heating by the molten ferrous alloy from a temperature below 100° C. to a temperature above 1500° C. in less than two seconds without core failure.

15. A mould assembly according to claim 13 or claim 14 in which the fired core body contains at least 0.03 percent by weight of devitrifying metallic ions and at least 15 percent by weight of cristobalite.

16. A mould assembly according to claim 15 wherein said core has a viscosity of at least 20 times $10^{11}$ poises at 1400° C.

17. A mould assembly according to claim 14 wherein the core is formed by extruding refractory composition containing 1 to 5 parts of clay and 2 to 5 parts of cereal per 100 parts by weight of refractory particles and a tempering fluid which provides extrudable consistency.

18. A mould assembly according to claim 14 wherein the core is machined to close tolerances and then provided with a diffusion barrier layer with a thickness of from about 40 to about 100 microns.

19. A mould assembly according to claim 14 wherein the fired core has a circular cross section, a wall thickness of from about 3 to about 10 millimeters, and a length at least 10 times its external diameter.

20. A mould assembly according to claim 14 wherein the hole extending the length of the core has a diameter no greater than half the external diameter of the core and wherein the core has a machined outer surface covered by a barrier layer with a thickness of at least 40 microns.

21. A mould assembly according to claim 14 wherein said hollow core body has a length at least 20 times its wall thickness and is covered by a barrier layer to cause gases to move radially inwardly and to avoid metal reactions at the surface of the core, whereby the hole formed in casting by the core is free of gas holes and other surface imperfections and the portions of the core at the metal surface can readily be removed by leaching.

* * * * *